US008028339B2

(12) United States Patent
Han (10) Patent No.: US 8,028,339 B2
(45) Date of Patent: Sep. 27, 2011

(54) NETWORK DEVICE AND METHOD FOR PROVIDING CONTENT COMPATIBILITY BETWEEN NETWORK DEVICES HAVING DIFFERENT RESPECTIVE DIGITAL RIGHTS MANAGEMENT METHODS

(75) Inventor: Hee-chul Han, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1051 days.

(21) Appl. No.: 10/874,571

(22) Filed: Jun. 24, 2004

(65) Prior Publication Data
US 2005/0022033 A1 Jan. 27, 2005

(30) Foreign Application Priority Data
Jun. 26, 2003 (KR) .................. 10-2003-0041979

(51) Int. Cl.
*G06F 17/30* (2006.01)
(52) U.S. Cl. .................... 726/26; 726/27; 713/191
(58) Field of Classification Search .............. 726/26, 726/27; 713/191; 705/51, 57
See application file for complete search history.

(56) References Cited

U.S. PATENT DOCUMENTS

| | | | |
|---|---|---|---|
| 5,218,637 A | 6/1993 | Angebaud et al. | |
| 6,944,776 B1* | 9/2005 | Lockhart et al. | 713/176 |
| 7,010,808 B1* | 3/2006 | Leung et al. | 726/26 |
| 7,058,606 B2* | 6/2006 | Stefik et al. | 705/51 |
| 7,076,805 B2* | 7/2006 | Bate et al. | 726/31 |
| 7,120,250 B2* | 10/2006 | Candelore | 380/200 |
| 2002/0023014 A1* | 2/2002 | Hughes et al. | 705/26 |
| 2002/0087876 A1* | 7/2002 | Larose | 713/200 |
| 2003/0196121 A1* | 10/2003 | Raley et al. | 713/201 |
| 2004/0003139 A1* | 1/2004 | Cottrille et al. | 709/331 |
| 2004/0003390 A1* | 1/2004 | Canter et al. | 717/178 |
| 2004/0133632 A1* | 7/2004 | Messerges et al. | 709/203 |
| 2004/0168061 A1* | 8/2004 | Kostal et al. | 713/170 |
| 2004/0168077 A1* | 8/2004 | Waxman et al. | 713/200 |
| 2004/0172533 A1* | 9/2004 | DeMello et al. | 713/164 |

FOREIGN PATENT DOCUMENTS

| | | | |
|---|---|---|---|
| KR | 1020020089472 A | 11/2002 | |
| KR | 2003-0027066 A | 4/2003 | |

OTHER PUBLICATIONS

"Federated Digital Rights Management" D-Lib Magazine, Jul./Aug. 2002. http://www.dlib.org/dlib/july02/martin/07martin.html.*

(Continued)

*Primary Examiner* — Hosuk Song
*Assistant Examiner* — Thomas Gyorfi
(74) *Attorney, Agent, or Firm* — Sughrue Mion, PLLC (57) ABSTRACT

The present invention relates to a network device and a method for providing content compatibility between network devices having different respective digital rights management methods. The method includes exchanging security program lists of the network devices, comparing the security program list of one network device with the security program list of the other network device based on the exchanged security program lists, and installing a security program required for using content of the other network device according to the comparison result. Accordingly, there is an advantage in that the network devices using the different respective DRM-based security programs can exchange content with one another and use the content of the other network device by using the predetermined security program update methods.

12 Claims, 7 Drawing Sheets

OTHER PUBLICATIONS

"Using Protected Files (DRM)" http://www.microsoft.com/windows/windowsmedia/player/faq/drm.mspx#q11_11.*

Comer, Douglas E. "Internetworking with TCP/IP, Volume I" © 1995 Prentice Hall, Inc. pp. 60, 92, 100, and 572.*

Winslett, Marianne. "Updating Logical Databases" Abstract/synopsis published in SIGART Bulletin vol. 3, No. 4 ISBN: 0-521-37371-9, published in 1991 (2 pages).*

Cammarata, Stephanie et al. "Extending a Relational Database with Deferred Referential Integrity Checking and Intelligent Joins" Proceedings of the 1989 ACM International Conference on Management of Data (pp. 88-97).*

Belussi, Alberto et al. "An Integrity Constraints Driven System for Updating Spatial Databases" Proceedings of the $8^{th}$ ACM International Symposium on Advances in Geopgraphic Information Systems. © 2000 ACM. (pp. 121-128).*

* cited by examiner

NETWORK DEVICE AND METHOD FOR PROVIDING CONTENT COMPATIBILITY BETWEEN NETWORK DEVICES HAVING DIFFERENT RESPECTIVE DIGITAL RIGHTS MANAGEMENT METHODS

BACKGROUND OF THE INVENTION

This application claims the priority of Korean Patent Application No. 10-2003-0041979 filed on Jun, 26, 2003, in the Korean Intellectual Property Office, the disclosure of which is incorporated herein by reference.

1. Field of Invention

The present invention relates to a network device and a method for providing content compatibility between network devices having different respective digital rights management methods. More particularly, the present invention enables network devices having different respective digital rights management methods to transfer and use content between them, by using a security program management module for installing into a specific network device a security program required for using content of other network devices having a security program based on a different digital rights management method through a security program update method.

2. Description of the Related Art

Recently, as digital content becomes more widely distributed, various technologies have been actively developed such that reliable distribution environments capable of efficiently protecting against illegal copying of digital content, allowing transaction parties to use digital content in a lawful manner, and making profit from the use of digital content can be provided or established.

Particularly, digital rights management (DRM) has recently attracted public attention. DRM is a system that protects, manages and distributes digital content, and in a wide sense, is also defined as a technique, procedure, processing and program for managing digital rights, including hardware and software for enabling reliable licensing, secure and safe rights and authentication, and reliable environments and infrastructure.

Among the basic functions of DRM, a security technique has been widely used to protect against the illegal distribution of digital content, which can protect the content owner's rights and also provide consumers with easy and legal availability of digital content.

DRM protects digital content transmitted between network devices within one system or other systems connected thereto. In such a case, only the network device having a specific security program complying with the DRM technique is allowed to receive and use the digital content.

Thus, network devices having different respective DRM-based security programs cannot exchange or use digital content with one another.

Figure 1:
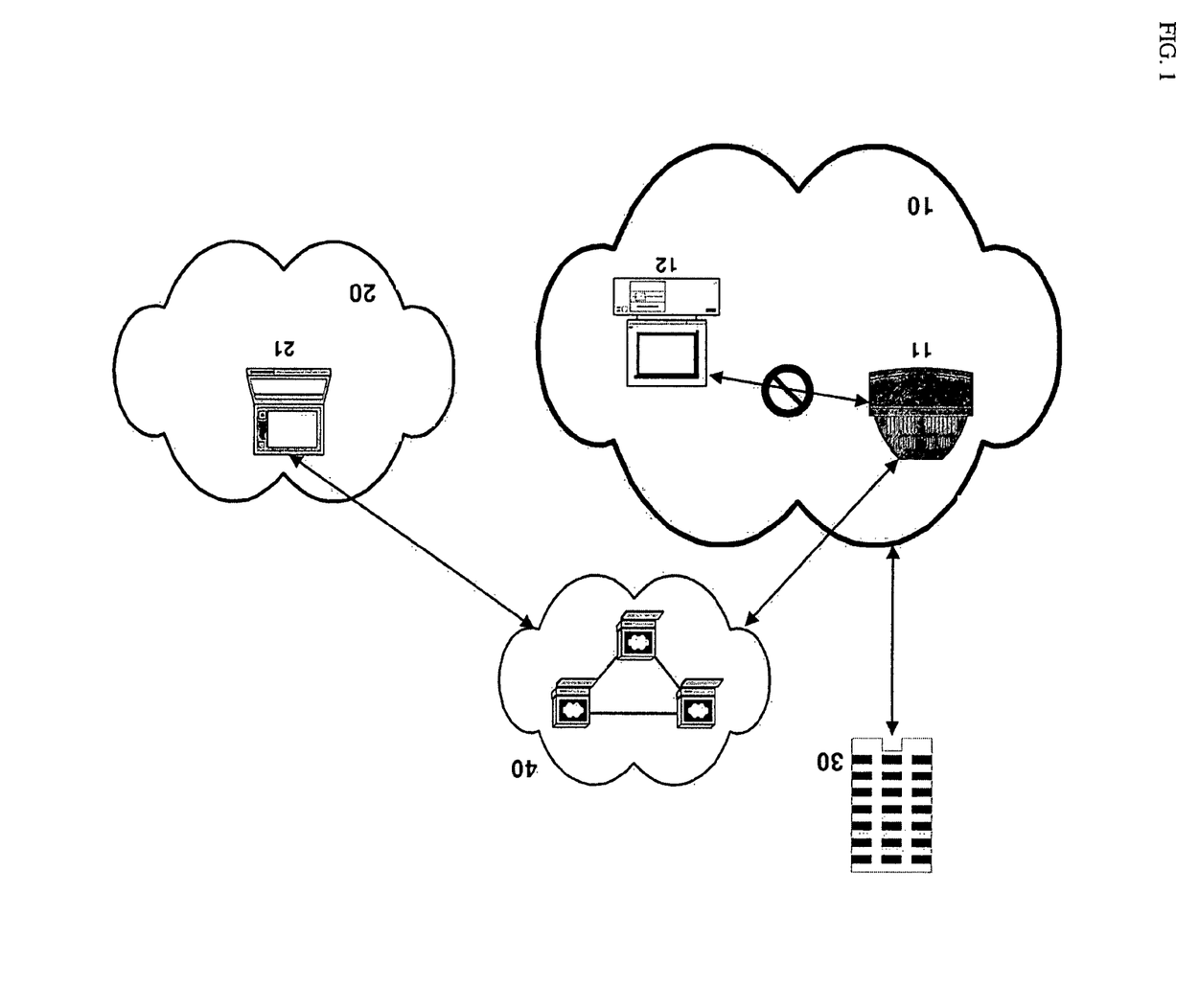
FIG. 1 is a view schematically illustrating a related art network system configuration.

FIG. 1 schematically shows a related art network system configuration.

Referring to FIG. 1, there is shown a network device 11 operating on a predetermined network 10. If another network device 12, which uses a DRM-based security program different from that of the network device 11, is connected to the network 10, the newly connected network device 12 is unable to use the digital content or can use only digital content of which security is released, because it uses a security program different from that of the network device 11 operating on the network 10.

That is, even though a specific network device using a different DRM method has been registered into a network service through an authentication process according to networking techniques, DRM characteristics for managing digital content through domain management and encryption make it impossible for the specific network device to communicate with other network devices.

Thus, there is a problem in that content provided from a broadcasting station 30 or a network device 21 operating on a network 20 connected via the Internet 40 cannot be used, and the content of the network device 11 operating on the same network 10 also cannot be used.

Accordingly, there is still a need for a method by which digital content can be exchanged and used between specified network devices, even though security programs using different DRM methods are employed therein.

SUMMARY OF THE INVENTION

A first object of the present invention is to enable content to be transmitted and used between network devices using security programs of different DRM methods by allowing a network management module to update a security program for content used in one network device and install the security program into a network device to which the network management module belongs.

The present invention enables a security program management module installed in a specific network device to install a security program required for using predetermined content of another network device in the specific network device by transmitting a security program list of the specific network device to the other network device, receiving a security program list from the other network device, comparing the received security program list with the security program list of the specific network device, and updating the security program list according to the comparison result.

In addition, the security program management module registers information on the installed security program into the security program list for management of the security program.

The security program list may be updated by updating a desired security program through a predetermined security program update method, e.g. an update method using a security program server, a storage device, another network device or a local security program server.

In the present invention, an operating process is commonly performed for each of the network devices in such a manner that content of one network device is transmitted, a security program list is received from the other network device, the received security program list is compared with a security program list of the one network device, and a desired security program is updated. Therefore, the following descriptions will be made in detail of the operating process conducted in a new network device which connects with a home network, receives a security program list used for data communications from the existing network device, and updates its own security program list of the new network device. The detailed descriptions of the operating process conducted in the existing network device will be omitted.

According to an aspect of the present invention, there is provided a network device, comprising a security program management module for receiving a security program list forwarded from another network device, comparing the received security program list with a security program list of the network device, and causing a desired security program necessary for using content of the other network device to be installed into the network device through a predetermined security program update method according to the comparison result.

According to another aspect of the present invention, there is also provided a method for providing content compatibility between network devices each having different rights management methods, comprising exchanging security program lists of the network devices, comparing the security program list of one network device with the security program list of the other network device based on the exchanged security program lists, and installing a security program required for using content of the other network device according to the comparison result.

BRIEF DESCRIPTION OF THE DRAWINGS

The above and other objects, features and advantages of the present invention will become apparent from the following description of exemplary embodiments given in conjunction with the accompanying drawings, in which.

DETAILED DESCRIPTION OF THE INVENTION

Hereinafter, a network device and a method for providing content compatibility between network devices using different respective digital rights management methods will be described in detail with reference to the accompanying drawings.

In explaining the network device and method for providing content compatibility between network devices using different respective digital rights management methods, content can be used between the network devices using different DRM methods, which are operating on a predetermined network, such as a home network. However, the embodiments herein are non-limiting, and it will be understood by those skilled in the art that various changes and other equivalents may be made to the method capable of using the contents between the network devices having security programs of different DRM methods.

Accordingly, the true scope of the present invention should be construed as being defined by the appended claims.

Figure 2:
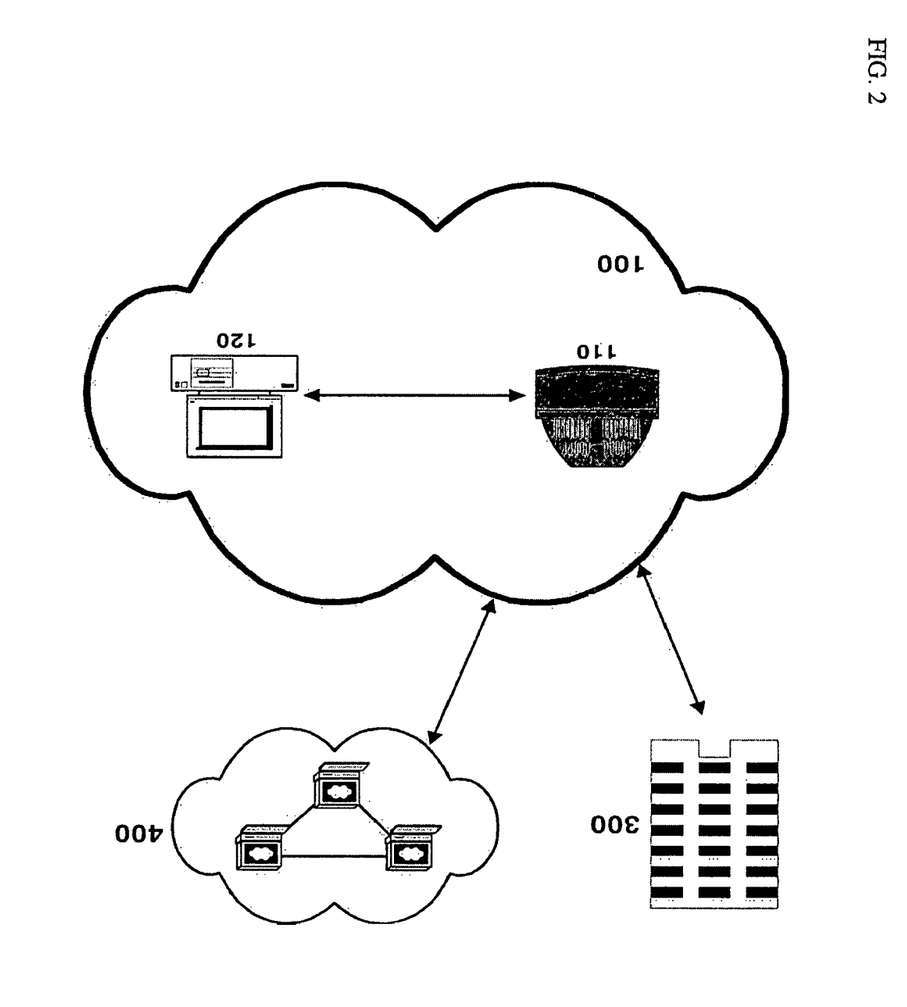
FIG. 2 is a view schematically illustrating the configuration of a network system including network devices according to the present invention.

FIG. 2 schematically shows the configuration of a network system including network devices according to the present invention. Throughout the drawings, the same item number is consistently used for similar structural components in order to provide a clear understanding of the present invention.

Referring to FIG. 2, the network system of the present invention includes a home network 100 in which network devices 110 and 120 having security programs using different DRM methods are connected to each other. The network system also includes a broadcasting station 300 and the Internet 400 corresponding to content providers for providing predetermined content according to the respective DRM methods of the network devices 110 and 120.

Each of the network devices 110 and 120 corresponds to a home networking device, and includes a security program management module (not shown). That is, when a new network device is installed and connected to the home network 100, the security program management module sends its own security program list to the new network device, receives a security program list from the new network device to compare the received security program list with its own security program list, and then downloads and installs a security program necessary for communication with the new network device according to a predetermined security program update method.

Further, the security program management module registers information on the security program installed in a relevant network device into the security program list and manages the security program.

The security program update method may allow a desired security program to be downloaded from a server or network device having a specific security program. For example, the security program may be updated by a security program server, a storage device, another network device or a local security program server.

According to the security program update method, the security program management module sends the address of a server for providing the desired security program, together with the security program list, so that another network device intended for data communication can easily download the desired security program.

For reference, in the aforementioned security program management module for the network device, the modules may be configured in hardware, software, or a combination thereof.

Therefore, it will fall within the scope and spirit of the present invention that the security program management module for the network device according to the present invention is configured in hardware or software, and it will also be apparent that various changes and modifications can be made thereto without departing from the scope and spirit of the present invention.

Next, the method of providing content compatibility between network devices having different respective DRM methods using the network device according to the present invention will be described in detail with reference to the accompanying drawings.

The method of the present invention comprises exchanging security program lists of the network devices, comparing the security program list of one network device with the security program list of the other network device based on the exchanged security program lists, and installing a security program required for using content of the other network device according to the comparison result.

Further, the method of the present invention further comprises requesting desired content from the other network device and using the desired content received from the other network device, when the security program is installed.

Such operating procedures of the present invention will be described in detail according to the security program update methods that may be classified into methods of updating the security programs by a security program server, storage device, another network device, and a local security program server, respectively.

Therefore, the processing procedures of the present invention will be explained according to the respective aforementioned update methods.

A method for updating a security program through the security program server may comprise requesting a desired security program from a remote security program server, downloading the security program from the server and installing the downloaded security program into a network device requesting the security program.

Figure 3:
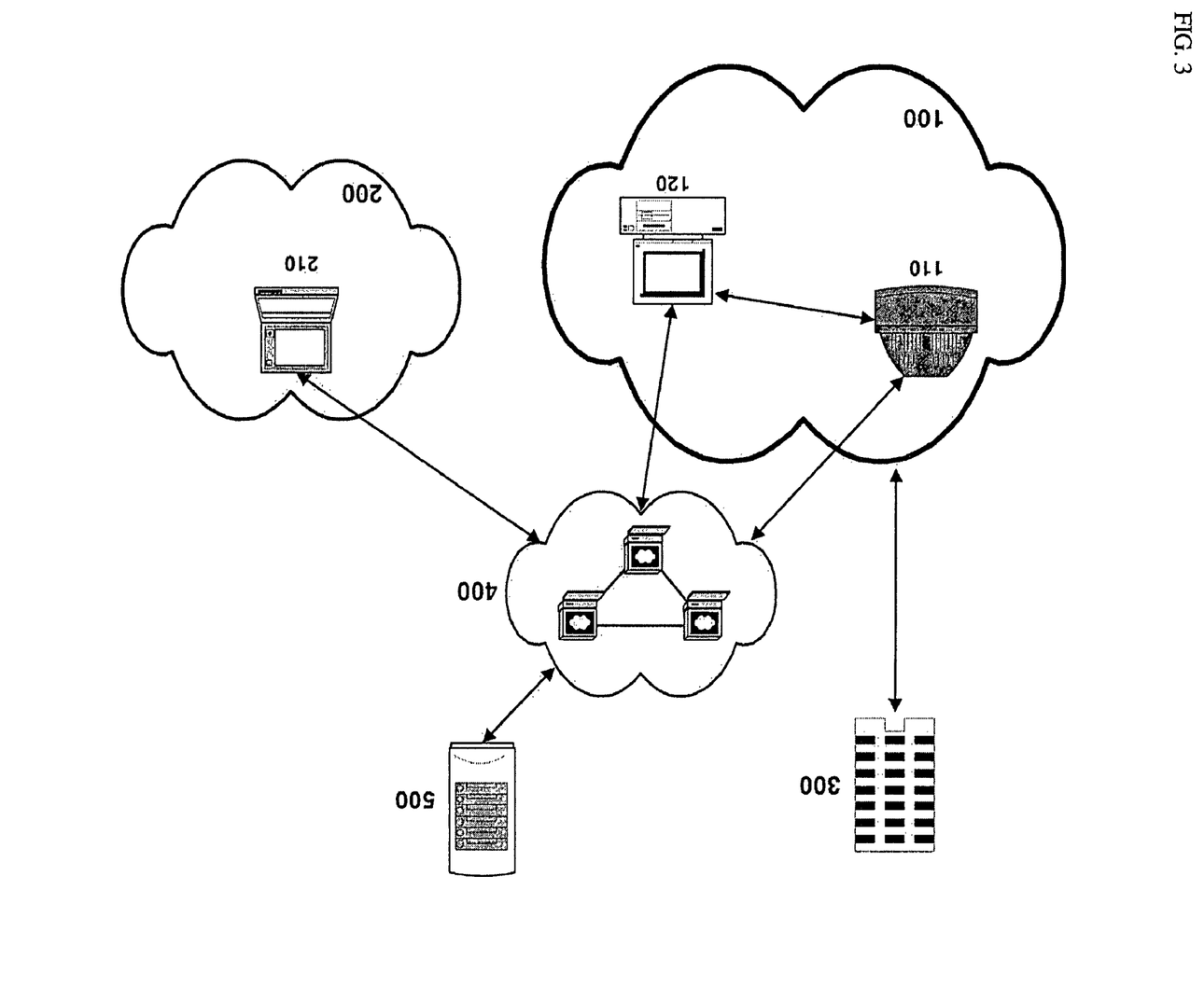
FIG. 3 is a view schematically illustrating the configuration of a network system for updating a security program through a security program server according to an embodiment of the present invention.

FIG. 3 schematically shows the configuration of a network system for updating a security program through a security program server according to an embodiment of the present invention.

Referring to FIG. 3, the network system is configured to include network devices 110 and 120, each having a security program management module and connected with each other in a home network 100, a broadcasting station 300 and Internet 400 for providing the network device 110 or 120 with various kinds of content according to a predetermined DRM method, a network device 210 present in another home network 200 which is connected via the broadcasting station 300 or Internet 400, and a security program server 500 for providing a desired security program to the network device 110 or 120 according to a request thereof.

Figure 4:
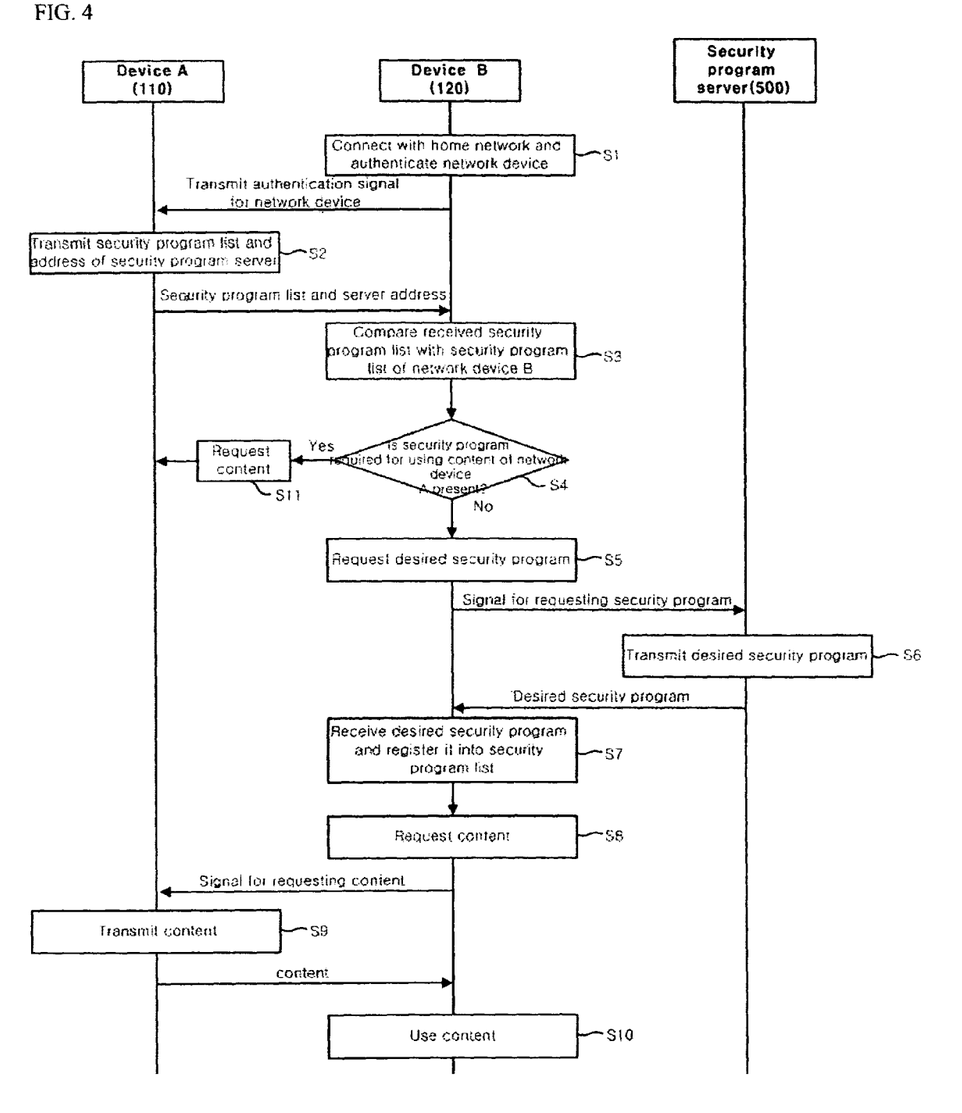
FIG. 4 is a flowchart schematically illustrating a process of updating a security program through a security program sever according to an embodiment of the present invention.

FIG. 4 schematically illustrates a process of updating a security program by a security program sever according to an embodiment of the present invention.

Referring to FIG. 4, when the network device 120 is connected to the home network 100 to which the network device 110 is connected, an authentication process for the network device 120 is first performed through a typical home networking technique (S1).

After the authentication process has been completed, the network device 110 transmits its own security program list and the address of a security program server to the network device 120 to provide the network device 120 with content used by the network device 110 (S2).

When receiving the security program list of the network device 110 and the address of the security program server from the network device 110, the network device 120 compares its own security program list with the received security program list of the network device (S3).

Based on the comparison, it is determined whether a desired program necessary for using the content of the network device 110 is present in the security program list of the network device 120 (S4).

If it is determined that the desired program necessary for using the content of the network device 110 is not present in the security program list of the network device 120, the network device 120 accesses the security program server 500 using the address of the server received from the network device 110 and requests the desired security program from the security program server 500 (S5).

The security program server 500 retrieves the desired security program requested by the network device 120 and forwards the retrieved security program to the network device 120 (S6). Then, the network device 120 downloads and installs the security program forwarded from the security program server 500, and then, registers the security program in its own security program list (S7).

Thereafter, the network device 120 generates and sends a signal for requesting the network device 110 to transfer desired content (S8).

In response to the signal received from the network device 120, the network device 110 sends the desired content to the network device 120 (S9) which in turn uses the desired content (S10).

On the other hand, if it is determined that the desired program necessary for using the contents of the network device 110 is present in the security program list of the network device 120, the network device 120 requests the network device 110 to transfer the desired content in order to use the desired content received from the network device 110 (S11).

Next, a method for updating the security program using a storage device will be described. Assuming that a certain home network device is sold together with a storage device (for example, a smart card) in which a security program installed into the network device is stored in the form of component software, the security program necessary for using the content of the certain network device can be directly downloaded from the storage device and installed into another network requiring the content.

Figure 5:
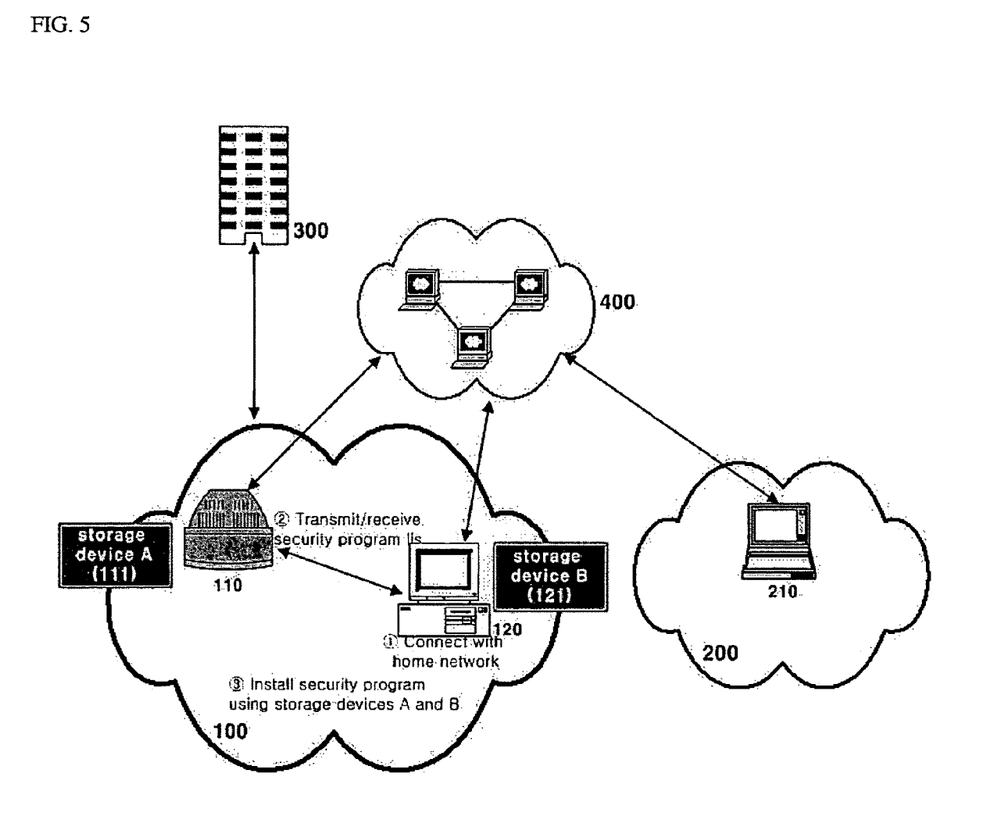
FIG. 5 is a view schematically illustrating the configuration of a network system for updating a security program through a storage device according to another embodiment of the present invention.

FIG. 5 schematically shows the configuration of a network system for updating a security program using a storage device according to another embodiment of the present invention.

Referring to FIG. 5, when a new network device 120 is installed and connected to a home network 100 to which the network device 110 is connected (①), an authentication process for the network device 120 is first performed through a home networking technique.

After the authentication process has been completed, the network devices 110 and 120 transmit and receive their own security program lists to and from each other in order to exchange the security program lists with each other (②).

Then, the network device 120 compares its own security program list with the security program list received from the network device 110 and determines whether a desired security program necessary for using content of the network device 110 is present in its own security program list.

If it is determined that the desired security program is not present in the security program list of the network device 120, a message requesting the desired security program is displayed on a predetermined display means to inform the user that the desired security program is needed.

When the user inserts a storage device 111 of the network device 110 into the network device 120 in response to the displayed message, the network device 120 downloads the desired security program from the inserted storage device 111 and installs the downloaded security program therein.

If it is determined that the desired security program is present or has been installed using the storage device 111, the network device 120 can provide its own desired contents according to the request of the network device 110.

Furthermore, the network device 110 compares its own security program list with the security program list received from the network device 120 and determines whether a desired security program necessary for using contents of the network device 120 is present in its own security program list.

If it is determined that the desired security program is not present in the security program list of the network device 110, a message requesting the desired security program is displayed on a predetermined display means to inform the user that the desired security program is needed.

When the user inserts a storage device 121 of the network device 120 into the network device 110 in response to the displayed message, the network device 110 downloads the desired security program from the inserted storage device 121 and installs the downloaded security program therein.

If it is determined that the desired security program is present or has been installed using the storage device 121, the network device 110 can provide its own desired contents according to the request of the network device 120.

According to the above procedures, each of the network devices 110 and 120 can install the desired security program necessary for performing network communication with each other by using the storage device of the other network device (③).

Thus, each of the network devices 110 and 120 with the desired security program installed therein can use the content of the other network device.

Next, a method for updating a security program through another network device will be described. According to this method, a specific network device may download a DRM-based security program necessary for using desired content directly from another network device intended for using the desired content and install the required security program therein.

Figure 6:
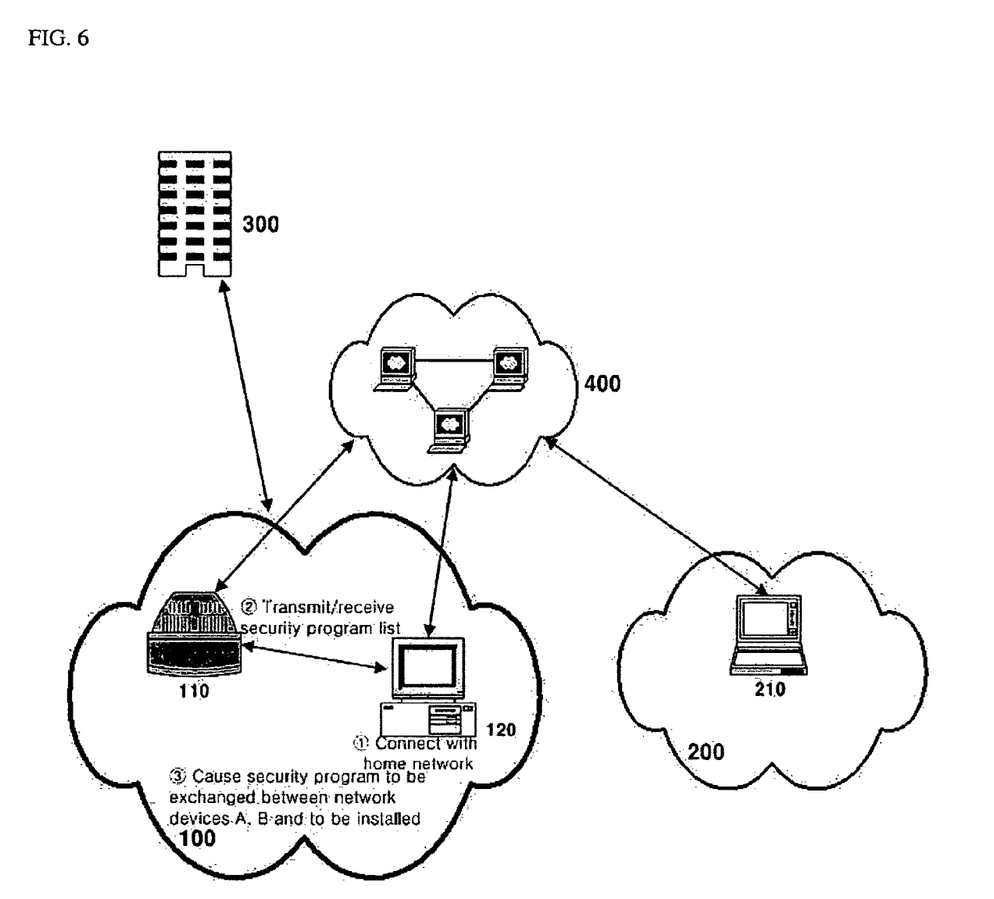
FIG. 6 is a view schematically illustrating the configuration of a network system for updating a security program through any other network device according to a further embodiment of the present invention.

FIG. 6 schematically shows the configuration of a network system for updating a security program using another network device according to a further embodiment of the present invention.

Referring to FIG. 6, when a new network device 120 is installed and connected to a home network 100 to which the network device 110 is connected (①), an authentication process for the network device 120 is first performed through an authentication method over the home network 100.

After the authentication process has been completed, the network devices 110 and 120 transmit and receive their own security program lists to and from each other in order to exchange the security program lists with each other (②).

Then, the network device 120 compares its own security program list with the security program list received from the network device 110 and determines whether a desired security program necessary for using content of the network device 110 is present in its own security program list.

If it is determined that the desired program is present in the security program list of the network device 120, a signal requesting the transmission of desired content is sent to the network device 110 so that the desired content received from the network device 110 can be used.

If it is determined that the desired security program is not present, the network device 120 requests the desired security program from the network device 110, installs the security program received from the network device 110, and registers the security program into its own security program list.

Furthermore, the network device 110 also compares its own security program list with the security program list received from the network device 120, and determines whether a desired security program necessary for using contents of the network device 120 is present in its own security program list.

If it is determined that the desired security program is present in the security program list of the network device 110, a signal requesting the transmission of desired contents is sent to the network device 120 so that the desired content received from the network device 120 can be used.

If it is determined that the desired security program is not present, the network device 110 requests the desired security program from the network device 120, installs the security program received from the network device 120, and registers the security program into its own security program list.

According to these procedures, each of the network devices 110 and 120 can exchange and install the desired security program.

Thus, each of the network devices 110 and 120 with the desired security program installed therein can use the content of the other network device.

Next, a method for updating a security program through a local security program server will be described. Assuming that the local security program server is present in the home network, it is configured such that a security program required for using predetermined content through communication between a local security program server and a remote security program server can be installed in a specific network device.

Figure 7:
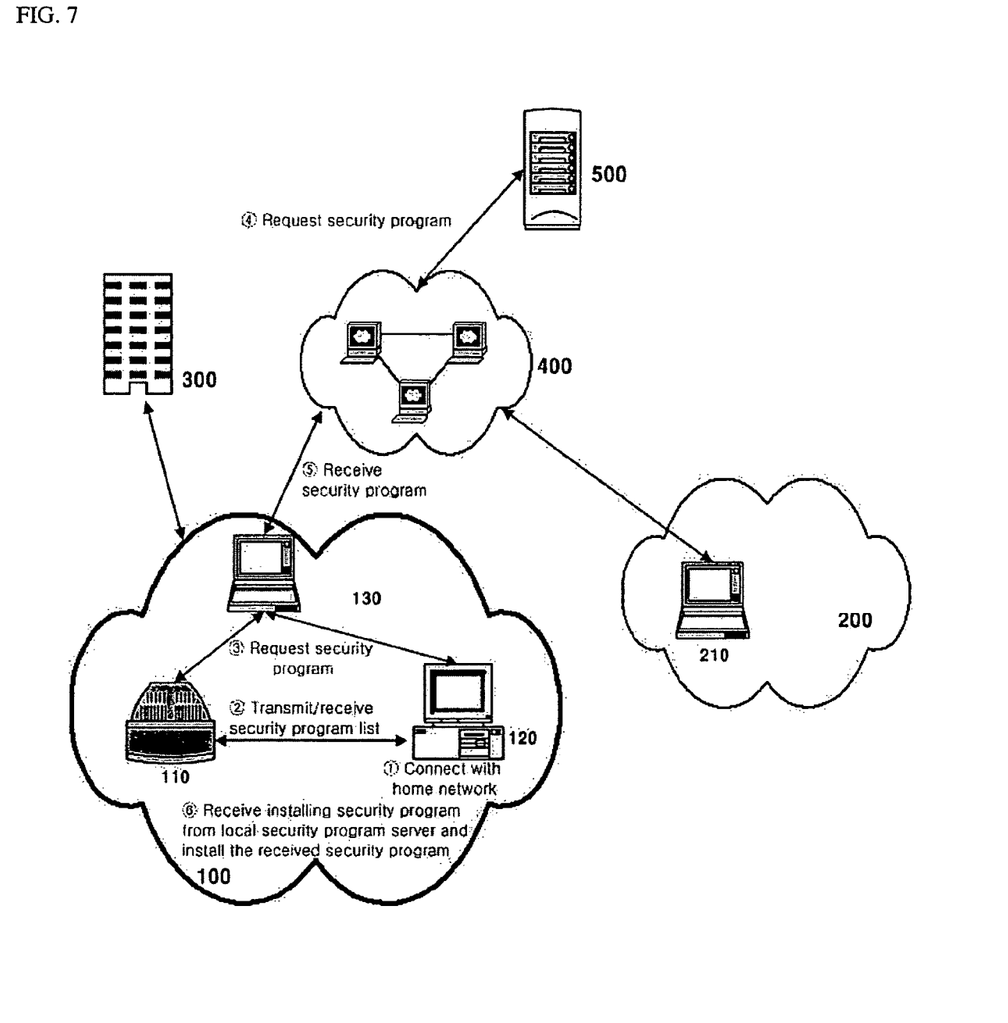
FIG. 7 is a view schematically illustrating the configuration of a network system for updating a security program through a local security program server according to yet another embodiment of the present invention.

FIG. 7 schematically shows the configuration of a network system for updating a security program using a local security program server according to yet another embodiment of the present invention.

Referring to FIG. 7, when a new network device 120 is installed and connected to a home network 100 to which a network device 110 is connected (①), an authentication process for the network device 120 is first performed through an authentication method over the home network 100.

After the authentication process has been completed, the network devices 110 and 120 transmit and receive their own security program lists to and from each other in order to exchange the security program lists with each other (②).

Then, the network device 120 compares its own security program list with the security program list received from the network device 110 and determines whether a desired security program necessary for using content of the network device 110 is present in its own security program list.

If it is determined that the desired program is present in the security program list of the network device 120, a signal requesting the transmission of desired content is sent to the network device 110 so that the desired content received from the network device 110 can be used.

If it is determined that the desired security program is not present, the network device 120 transmits information on the security program server address received from the network device 110 to a local security program server 130 and requests the desired security program from the local server.

Furthermore, the network device 110 also compares its own security program list with the security program list received from the network device 120, and determines whether a desired security program necessary for using contents of the network device 120 is present in its own security program list.

If it is determined that the desired security program is present in the security program list of the network device 110, a signal requesting the transmission of desired content is sent to the network device 120 so that the desired content received from the network device 120 can be used.

If it is determined that the desired security program is not present, the network device 110 transmits information on the security program server address received from the network device 120 to the local security program server 130 and requests the desired security program from the local server.

According to the above procedures, when receiving a request for a desired security program from each of the network devices 110 and 120 (③), the local security program server 130 requests the desired security program from the remote security program server 500, in response to the request received from the network device 120, by referring to the information on the security program server address (④), and then receives the desired security program from the remote security program server 500 (⑤).

Thereafter, the local security program server 130 sends the received security program to the network device 110 or 120, which in turn installs the desired security program received from the local security program server 130 (⑥) and registers the security program into the security program list.

Thus, each of the network devices 110 and 120 with the desired security program installed therein can use the content of the other network device.

According to the present invention, there is an advantage in that the network devices using the different respective DRM-based security programs can exchange content with one another and use the content of the other network device by using the predetermined security program update methods.

Although the present invention has been described in detail in connection with the preferred embodiments of the present invention, it will be apparent to those skilled in the art that various changes and modifications can be made thereto without departing from the spirit and scope of the invention. Thus, simple modifications to the embodiments of the present invention fall within the scope of the present invention.

What is claimed is:

1. A network device having a first security program list corresponding to a first digital rights management method, the network device comprising:
    a hardware module comprising a security program management module for receiving a second security program list forwarded from another network device, wherein the second security program list corresponds to a second digital rights management method which is different from the first digital rights management method, comparing the received second security program list with the first security program list of the network device, and causing a desired security program necessary for using content of the other network device to be installed into the network device according to the comparing
    wherein the security program management module transmits the first security program list to the other network device to use the content of the other network device;
    wherein the security program management module transmits an address of a security program server providing the security program registered in the first security program list when forwarding the first security program list to the other network device, and receives an address of a security program server providing the security program registered in the second security program list when receiving the second security program list from the other network device.

2. The network device as claimed in claim 1, wherein the security program management module registers information on the installed security program into the first security program list and manages the registered information.

3. The network device as claimed in claim 1, wherein the first security program list includes at least one security program for the first digital rights management method, and wherein the second security program list includes at least one security program for the second digital rights management method.

4. The network device as claimed in claim 1, wherein if the second security program list includes the desired security program, and the first security program list does not include the desired security program, the security program management module requests the desired security program from a security program server.

5. The network device as claimed in claim 1, wherein if the second security program list and the first security program list include the desired security program, the security program management module requests content from the another network device.

6. A method for providing content compatibility between a first network device and a second network device, the method comprising:
    (a) exchanging security program lists between the first network device and the second network device, wherein a first device has a first security program list corresponding to a first digital rights management method and wherein a second device has a second security program list corresponding to a second digital rights management method which is different from the first digital rights management method;
    (b) comparing the first security program list with the second security program list based on the exchanged security program lists; and
    (c) installing a security program required for using content of the second network device and the first network device on the first network device and the second network device respectively, according to the comparing;
    wherein (a) comprises transmitting information on an address of a security program server providing the security program registered in the first security program list and information on an address of a security program server providing the security program registered in the second security program list to the second network device and the first network device respectively, together with the first security program list and the second security program list during the exchange.

7. The method as claimed in claim 6, further comprising requesting desired content from the second network device and the first network device and using the desired content received from the second network device and the first network device, when the security program required for using content of the second network device and the first network device is installed on the first network device and the second network device respectively.

8. The method as claimed in claim 6, wherein (c) comprises:
    requesting the desired security program from the security program server by referring the information on the security program server address; and
    downloading the requested security program from the security program server and installing the downloaded program.

9. The method as claimed in claim 6, wherein (c) comprises:
    requesting the desired security program by sending information on the security program server address to a local security program server connected to each network device;
    causing the local security program server to request the desired security program from a remote security program server corresponding to the server address, to download the desired security program, and to transmit the downloaded security program to each network device; and
    installing the transmitted security program into each network device.

10. The method as claimed in claim 6, wherein the installing a security program required for using content of the second network device comprises:
    requesting insertion of a predetermined storage device in which the desired security program installed in the second network device is stored; and
    receiving and installing the security program after the storage device has been inserted;
    wherein the installing a security program required for using content of the first network device comprises:

requesting insertion of a predetermined storage device in which the desired security program installed in the first network device is stored; and receiving and installing the security program after the storage device has been inserted.

11. The method as claimed in claim 6, wherein the installing a security program required for using content of the second network device comprises:

requesting the desired security program from the second network device; and downloading the requested security program from the second network device and installing the downloaded security program on the first network device; and wherein the installing a security program required for using content of the first network device comprises:

requesting the desired security program from the first network device; and downloading the requested security program from the first network device and installing the downloaded security program on the second network device.

12. The method as claimed in claim 6, wherein the first security program list includes at least one security program for the first digital rights management method, and wherein the second security program list includes at least one security program for the second digital rights management method.

* * * * *